US010739929B2

(12) United States Patent
Lee et al.

(10) Patent No.: US 10,739,929 B2
(45) Date of Patent: Aug. 11, 2020

(54) DISPLAY DEVICE INCLUDING TOUCH SENSING LAYER

(71) Applicant: Samsung Display Co. Ltd., Yongin-si, Gyeonggi-do (KR)

(72) Inventors: So La Lee, Asan-si (KR); Chi Wook An, Hwaseong-si (KR); Sang Hyun Jun, Suwon-si (KR); Jong Seok Kim, Yongin-si (KR); Jae Hyun Lee, Seoul (KR); Eun Ae Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 86 days.

(21) Appl. No.: 15/918,014

(22) Filed: Mar. 12, 2018

(65) Prior Publication Data

US 2019/0034010 A1 Jan. 31, 2019

(30) Foreign Application Priority Data

Jul. 31, 2017 (KR) .......................... 10-2017-0097081

(51) Int. Cl.
*G06F 3/047* (2006.01)
*G06F 3/041* (2006.01)
*G06F 3/044* (2006.01)

(52) U.S. Cl.
CPC .............. *G06F 3/047* (2013.01); *G06F 3/044* (2013.01); *G06F 3/0412* (2013.01); *G06F 3/0418* (2013.01); *G06F 2203/04112* (2013.01)

(58) Field of Classification Search
CPC ................................ G06F 3/04; H04L 27/1251
See application file for complete search history.

(56) References Cited

U.S. PATENT DOCUMENTS

| 2013/0002133 | A1* | 1/2013 | Jin | ........................ H01L 51/524 313/511 |
| 2014/0333555 | A1* | 11/2014 | Oh | .......................... G06F 3/044 345/173 |
| 2016/0306472 | A1* | 10/2016 | Park | ...................... G06F 3/0412 |
| 2018/0046301 | A1* | 2/2018 | Zhou | ..................... G06F 3/0412 |
| 2018/0157357 | A1* | 6/2018 | Lin | ..................... H01L 27/1251 |

FOREIGN PATENT DOCUMENTS

| KR | 1020140043944 A | 4/2014 |
| KR | 1020140100880 A | 8/2014 |
| KR | 1020150070664 A | 6/2015 |
| KR | 1020160131150 A | 11/2016 |

* cited by examiner

*Primary Examiner* — Sepehr Azari
(74) *Attorney, Agent, or Firm* — Cantor Colburn LLP

(57) ABSTRACT

A display device includes a substrate divided into a display area and a peripheral area, a light-emitting element layer on the substrate and including a light-emitting element, a circuit element layer on the substrate and including a circuit element which drives the light-emitting element, an encapsulation film of which portions thereof are respectively in the display area and the peripheral area, and a plurality of sensing electrodes each on the portion of the encapsulation film which is in the display area, including a plurality of first sensing electrodes and a plurality of second sensing electrodes which intersect the first sensing electrodes. Each of the first sensing electrodes includes a plurality of mesh lines intersecting one another in a mesh shape, and widths of the first sensing electrodes increase as a distance of the first sensing electrode from a center of the display area to the peripheral area decreases.

20 Claims, 10 Drawing Sheets

DISPLAY DEVICE INCLUDING TOUCH SENSING LAYER

This application claims priority to Korean Patent Application No. 10-2017-0097081, filed on Jul. 31, 2017, and all the benefits accruing therefrom under 35 U.S.C. § 119, the disclosure of which is incorporated herein by reference in its entirety.

BACKGROUND

1. Field

The present disclosure relates to a display device equipped with a touch unit.

2. Description of the Related Art

A display device using self-emitting elements, among display devices, has attracted attention as a next-generation display device because of its many advantages such as a fast response speed, capability of realizing a moving image, wide viewing angle, and high luminance.

An electroluminescent unit manufactured using a self-emissive element includes a pixel electrode, an opposing electrode, and an electroluminescent layer interposed between the pixel electrode and the opposing electrode. The electroluminescent unit is highly sensitive to moisture, oxygen, light, and the like. Thus, when brought in contact with moisture, oxygen, light, and the like, the electroluminescent unit is highly likely to be damaged and thus to cause degradation of display quality. Accordingly, a thin-film encapsulation structure is used as a sealing technique for blocking external moisture, oxygen, light, and the like from infiltrating into the electroluminescent layer of the electroluminescent element. In the meantime, a display device may not only an output function for displaying an image, but also an input function capable of receiving a user's instruction.

SUMMARY

Exemplary embodiments of the present disclosure provide a display device which minimizes unevenness in touch sensitivity thereof.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a display device. The display device includes a substrate divided into a display area at which an image is displayed with light and a peripheral area which surrounds the display area; a light-emitting element layer disposed on the substrate, the light-emitting element layer including a light-emitting element which generates and emits the light; a circuit element layer disposed on the substrate, the circuit element layer including a circuit element which drives the light-emitting element to generate and emit the light; an encapsulation film which encapsulates the light-emitting element layer on the substrate, portions of the encapsulation film being respectively disposed in the display area and in the peripheral area of the substrate; and a plurality of sensing electrodes each disposed on the portion of the encapsulation film which is in the display area, including a plurality of first sensing electrodes and a plurality of second sensing electrodes which intersect the first sensing electrodes. Each of the first sensing electrodes includes a plurality of mesh lines intersecting one another in a mesh shape, each mesh line having a width, and the widths of the mesh lines of the first sensing electrodes increase as a distance of the first sensing electrode from a center of the display area to the peripheral area decreases.

According to another exemplary embodiment of the present disclosure, there is provided a display device. The display device includes a substrate divided into a display area at which an image is displayed with light and a peripheral area which surrounds the display area; a light-emitting element layer disposed on the substrate, the light-emitting element layer including a light-emitting element which generates and emits the light; a circuit element layer disposed on the substrate, the circuit element layer including a circuit element which drives the light-emitting element to generate and emit the light; an encapsulation film which encapsulates the light-emitting element layer on the substrate, portions of the encapsulation film being respectively disposed in the display area and in the peripheral area; and a plurality of sensing electrodes each disposed on the portion of the encapsulation film which is in the display area, including a plurality of first sensing electrodes and a plurality of second sensing electrodes which intersects the first sensing electrodes. Each of the first sensing electrodes includes a plurality of sensing patterns which senses a touch input to the display device, each of the plurality of sensing patterns including: an effective sensing electrode which senses the touch input and has a total planar area, and a dummy electrode which is adjacent to the effective sensing electrode and has a total planar area, and the total planar areas of the effective sensing electrodes increase as a distance of the first sensing electrode from a center of the display area to the peripheral area decreases.

According to the aforementioned and other exemplary embodiments of the present disclosure, a display device which minimizes unevenness in touch sensitivity thereof is provided.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
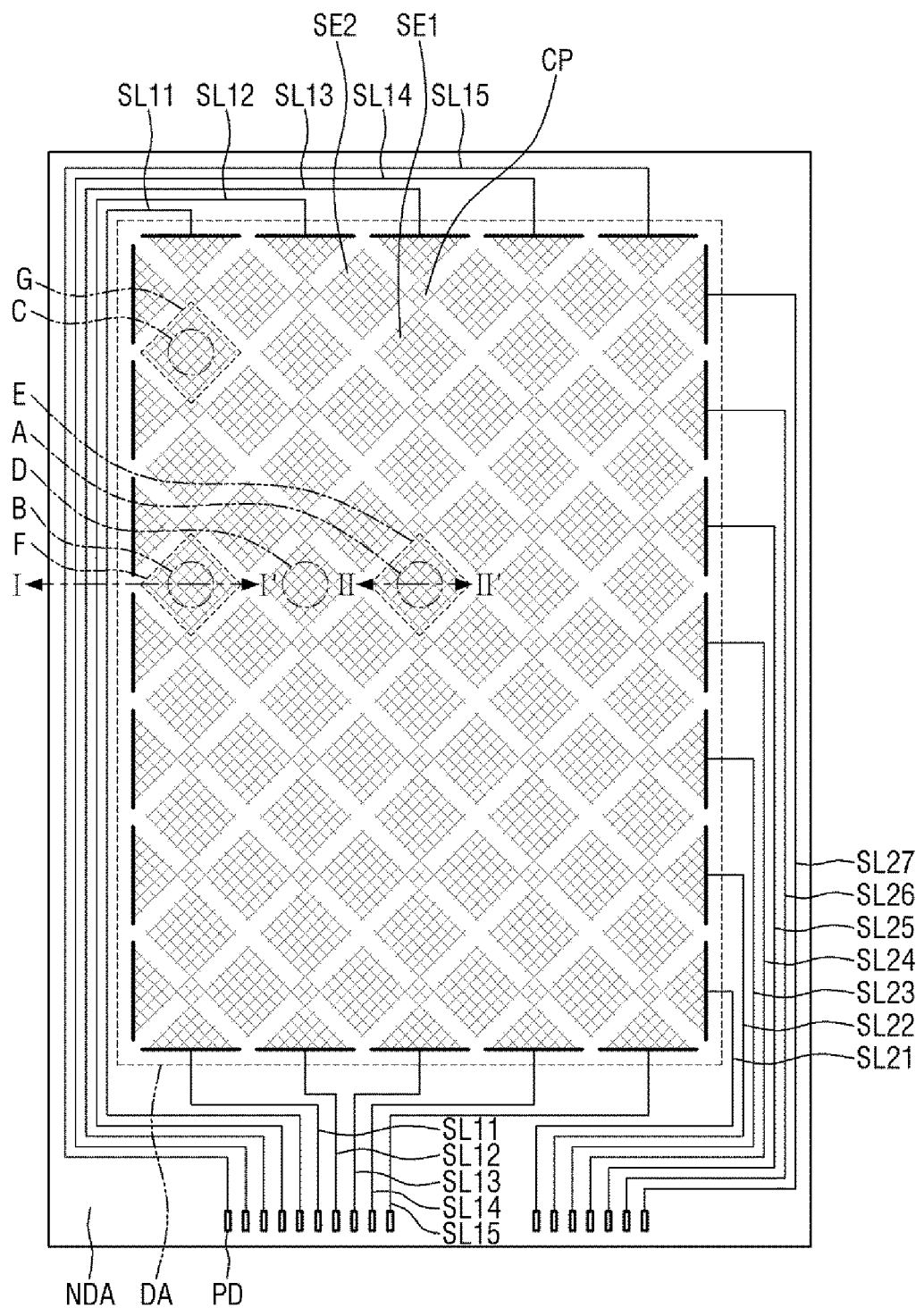
FIG. 1 is a top plan view of an exemplary embodiment of a display device according to the invention.

The invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Conventionally, in a display device having not only an output function for displaying an image, but also an input function capable of receiving a user's instruction, an input unit is disposed and integrated on an upper substrate, which is disposed to face a lower substrate, or an already-made input unit is attached to an organic substrate. In the case of a display device having both an output function and an input function and using the thin-film encapsulation structure, a conventional lower substrate may be replaced with a flexible film, and a conventional upper substrate may be replaced with the thin encapsulation structure, in which case, a touch unit may be integrated on the thin-film encapsulation structure.

However, in the display device using the thin-film encapsulation structure, the top surface of the thin-film encapsulation structure may not be flat. Thus, the touch sensitivity of the touch unit, which is integrated on the top of the thin-film encapsulation structure, may vary from one location to another location. Therefore, a structure is needed to address the problem of unevenness in touch sensitivity.

FIG. 1 is a top plan view of an exemplary embodiment of a display device according to the invention.

Specifically, FIG. 1 illustrates a layered structure in which a touch (panel) unit 300 (refer to FIG. 2) is disposed and the elements of the touch unit 300.

Referring to FIG. 1, the display device is divided into a display area DA and a peripheral area NDA. The display area DA may be disposed at the center of the display device and may be an area in which an image is displayed. The peripheral area NDA may be disposed along the sides or outer edges of the display device to surround the display area DA and may be an area in which no image is displayed.

Figure 2:
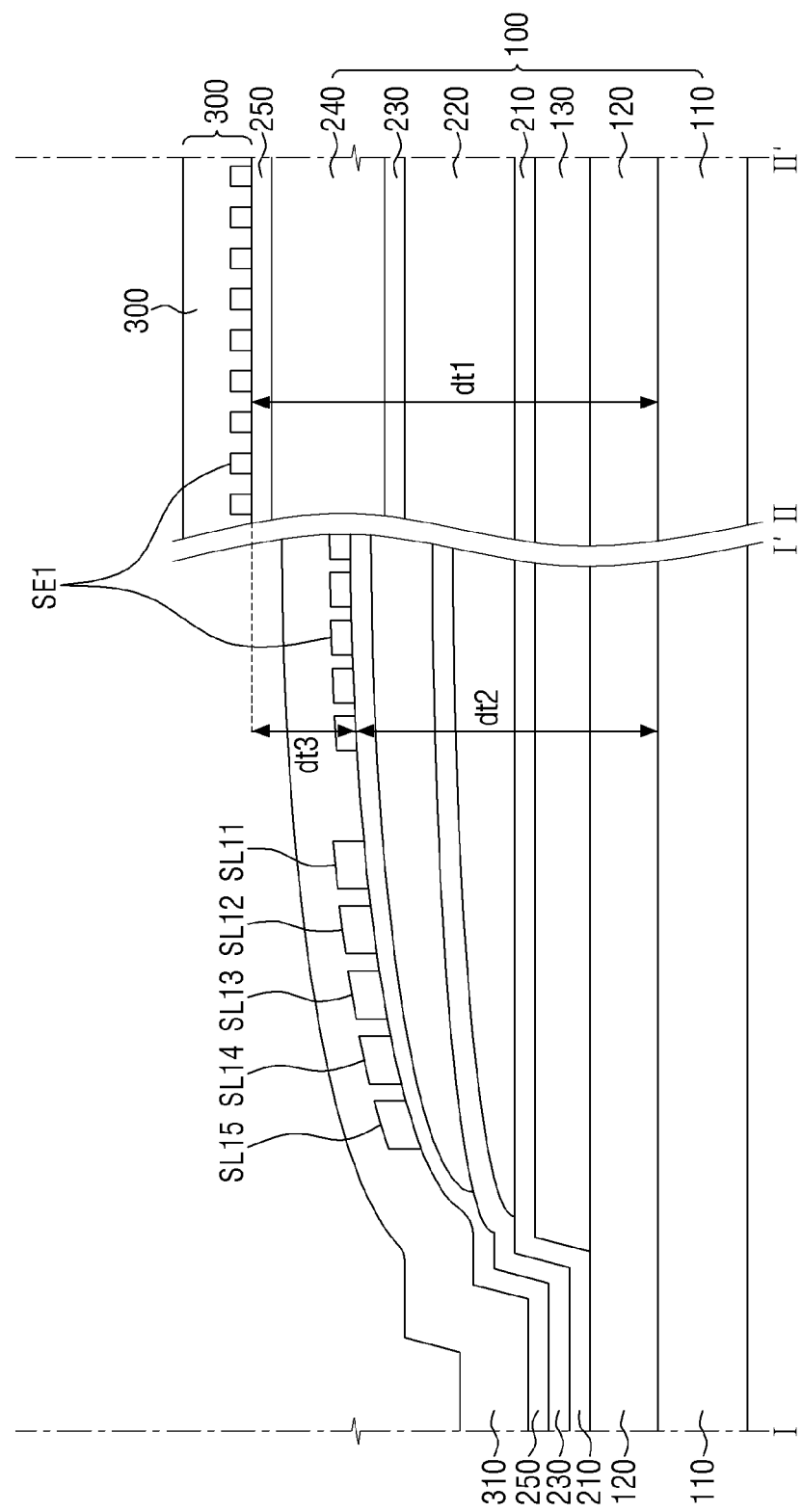
FIG. 2 is a cross-sectional view taken along lines I-I' and II-II' of FIG. 1.

The display device includes the touch unit 300 (refer to FIG. 2). The touch unit 300 may form an outer surface of the display device, such as at a viewing side thereof. The touch unit 300 includes first sensing electrodes SE11 through SE15, first signal lines SL11 through SL15 connected to the first sensing electrodes SE11 through SE15, second sensing electrodes SE21 through SE27, second signal lines SL21 through SL27 connected to the second sensing electrodes SE21 through SE27, and pads PD connected to the first signal lines SL11 through SL15 and the second signal lines SL21 through SL27.

Although not specifically illustrated, the touch unit 300 may further include optical dummy electrodes disposed in respective boundary areas between the first sensing electrodes SE11 through SE15 and the second sensing electrodes SE21 through SE27.

In the exemplary embodiment of FIG. 1, the first sensing electrodes SE11 through SE15 may be disposed to form a total of five columns, and the second sensing electrodes SE21 through SE27 may be disposed to form a total of seven rows. However, the numbers of columns and rows formed by the first sensing electrodes SE11 through SE15 and the second sensing electrodes SE21 through SE27, respectively, are not particularly limited and may vary.

The first sensing electrodes SE11 through SE15 and the second sensing electrodes SE21 through SE27 may be disposed to intersect each other. The first sensing electrodes SE11 through SE15 may be arranged in a first direction dr1 and respectively extend in a second direction dr2. The second sensing electrodes SE21 through SE27 may be arranged in the second direction dr2 and respectively extend in the first direction dr1. The first and second directions dr1 and dr2 may intersect each other. The first and second directions dr1 and dr2 may be perpendicular to each other, but the present disclosure is not limited thereto.

The first sensing electrodes SE11 through SE15 and the second sensing electrodes SE21 through SE27 may individually or together sense external input to the touch unit 300 in a mutual cap manner and/or a self-cap manner. Specifically, input to the first sensing electrodes SE11 through SE15 and the second sensing electrodes SE21 through SE27 may be used to calculate the coordinates of the external input in the mutual cap manner during a first period of time and may recalculate the coordinates of the external input in the self-cap manner during a second period of time.

The first sensing electrodes SE11 through SE15 and the second sensing electrodes SE21 through SE27 may be arranged to intersect each other in a mesh shape in the top plan view. As will be described later, the first sensing electrodes SE11 through SE15 and the second sensing electrodes SE21 through SE27 may be disposed to overlap with a black matrix (not illustrated) and may thus be invisible to a user.

The first sensing electrodes SE11 through SE15 and the second sensing electrodes SE21 through SE27 may include silver (Ag), aluminum (Al), copper (Cu), chromium (Cr), nickel (Ni), titanium (Ti), or the like, which can be processed at a relatively low temperature, but the present disclosure is not limited thereto. In an exemplary embodiment of manufacturing a display device, when a relatively low-temperature process is used, damage to the elements disposed below the touch unit 300 can be reduced or effectively prevented, even if the touch unit 300 is formed by a continuous process.

Each of the first sensing electrodes SE11 through SE15 includes a first sensing pattern SP1 provided in plurality connected to each other to form a single one first sensing electrode. Each of the second sensing electrodes SE21 through SE27 includes a second sensing pattern SP2 provided in plurality connected to each other to form a single one second sensing electrode. The first sensing patterns SP1 or the second sensing patterns SP2 are respectively connected to one another within a single one sensing electrode, by a connecting pattern CP provided in plurality.

The connecting patterns CP may electrically connect the first sensing patterns SP1, which are adjacent to one another in the second direction dr2, and may electrically connect the second sensing patterns SP2, which are adjacent to one another in the first direction dr1. Although not specifically illustrated, in a cross-section of the display device, the connecting patterns CP may be formed in multiple layers among layers of the layered-structure and may be connected in a bridge form via insulating layers and/or contact holes.

A total (planar) size of respective sensing electrodes, such as represented or defined by the sensing patterns thereof, may vary as a position thereof in the display area varies. Although not specifically illustrated, in an exemplary embodiment in a top plan view, first sensing patterns SP1 on left and right sides of the display area DA (e.g., in first and last columns) may have a smaller total (planar) size than first sensing patterns SP1 in the middle of the display area DA, for example, half the size of the first sensing patterns SP1 in the middle. Similarly, second sensing patterns SP2 on upper and lower sides of the display area DA (e.g., in first and last rows) may have a smaller total (planar) size than second sensing patterns SP2 disposed in the middle of the display area DA, for example, half the size of the second sensing patterns SP2 disposed in the middle.

The shapes of the first sensing electrodes SE11 through SE15 and the second sensing electrodes SE21 through S27 are not limited to those illustrated in FIG. 1. In the exemplary embodiment of FIG. 1, the first sensing electrodes SE11 through SE15 and the second sensing electrodes SE21 through S27 may have a shape in which there are no distinctions between sensing portions and connecting portions, such as, for example, a bar shape. As the bar shape, the boundaries of the sensing portions and connecting portions may be aligned with each other in the top plan view, along a length direction of a sensing electrode. The first sensing patterns SP1 and the second sensing patterns SP2, and/or the connecting portions CP, are illustrated as each being rhombic in shape in the top plan view, but the present disclosure is not limited thereto. That is, alternatively, the first sensing patterns SP1 and the second sensing patterns SP2 and/or the connecting portions CP, may have a polygonal shape in the top plan view other than a rhombic shape.

The first signal lines SL11 through SL15 are respectively connected to first ends and second ends of the first sensing electrodes SE11 through SE15. Two first signal line portions may form one first signal line among the first signal lines SL11 through SL15. Referring to FIG. 1, distal (first) ends of both of the two first signal line portions are disposed at a pad area in which the pads PD are disposed. The second signal lines SL21 through SL27 are respectively connected to first ends of the second sensing electrodes SE21 through S27. One single second signal line portion may extend from the first ends of the rows of the second sensing electrodes SE21 through S27, to dispose distal (first) ends of the single second signal line portions at the pad area in which the pads PD are disposed. Alternatively, the second signal lines SL21 through SL27 may be respectively connected to not only the first ends, but also second ends of the rows of the second sensing electrodes SE21 through S27. Alternatively, the first signal lines SL11 through SL15 may be respectively connected only to one end such as the first ends of the columns of the first sensing electrodes SE11 through SE15.

The pads PD are connected to first ends of each portion of the first signal lines SL11 through SL15 and first ends of the second signal lines SL21 through SL27. The pads PD may be passages through which voltage variations detected by the first sensing electrodes SE11 through SE15 and the second sensing electrodes SE21 through SE27 transmit to an element for processing the detected voltage variations. The element may be disposed outside the display device and/or within the display device, such as a processor.

In the top plan view, the first sensing patterns SP1 may have a mesh shape, and (conductive) lines that form the mesh shape of the first sensing patterns SP1 will hereinafter be referred to as a mesh line ML provided in plurality (of FIGS. 3 through 5). That is, the first sensing patterns SP1 may have a shape in which the mesh lines ML, which are metal wires respectively extending in a single (one) direction, are disposed to intersect one another to collectively form a mesh shape.

Figure 5:
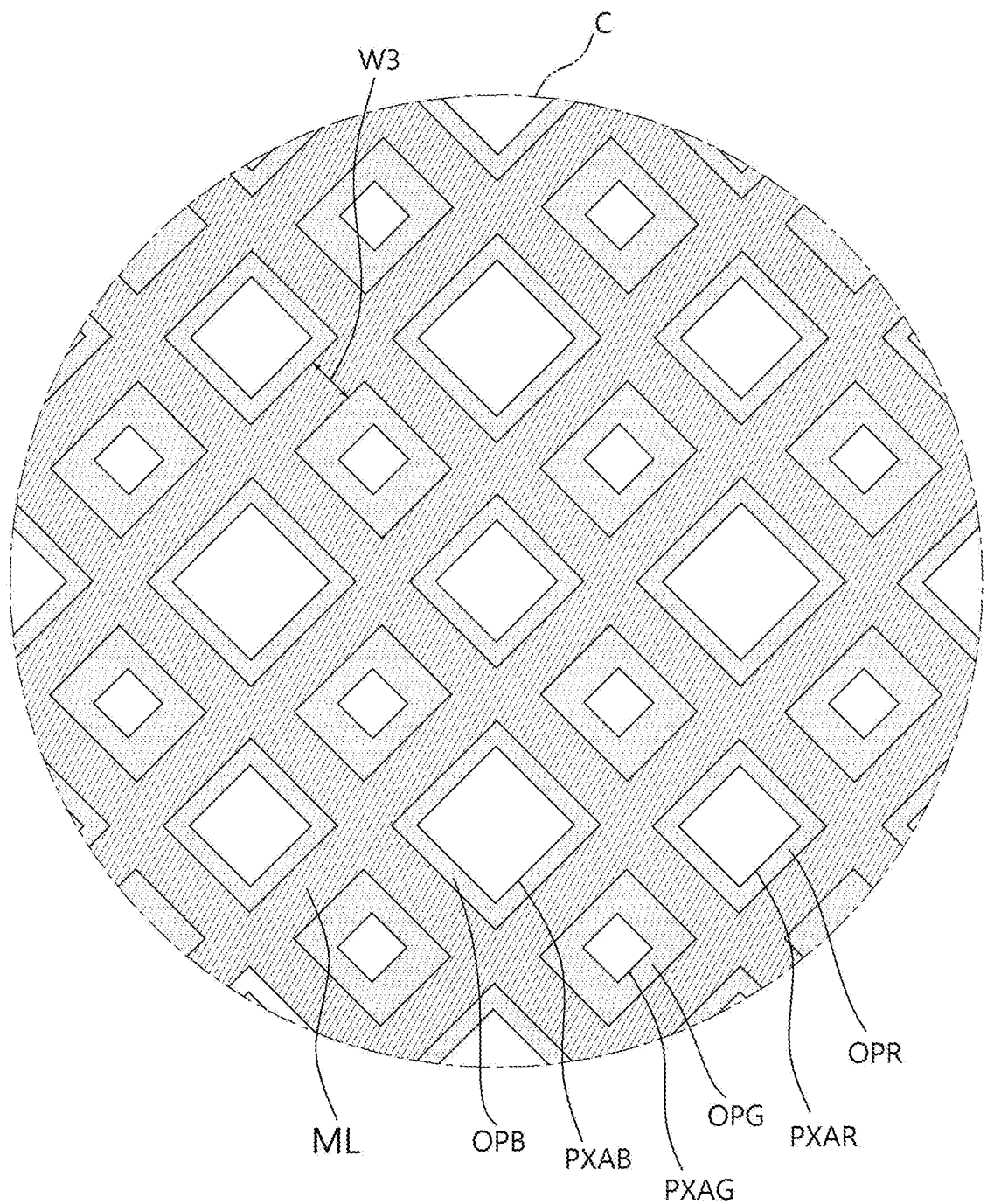
FIG. 5 is an enlarged top plan view of an area C of FIG. 1.

For example, as illustrated in FIG. 5, at a left side of the display area DA, the first first sensing electrode SE11 at the leftmost side of the display area DA may be configured to have a plurality of first sensing patterns SP1 connected to one another in a column along the second direction dr2. Each of the first sensing patterns SP1 of the first first sensing electrode SE11 includes a plurality of mesh lines ML, which intersect one another to form a mesh shape. Similarly, as illustrated in FIG. 3, at a middle of the display area DA, the third first sensing electrode SE13 may be configured to have a plurality of first sensing patterns SP1 connected to one another in a column along the second direction dr2. Each of the first sensing patterns SP1 of the third first sensing electrode SE13 includes a plurality of mesh lines ML, which intersect one another to form a mesh shape.

Figure 3:
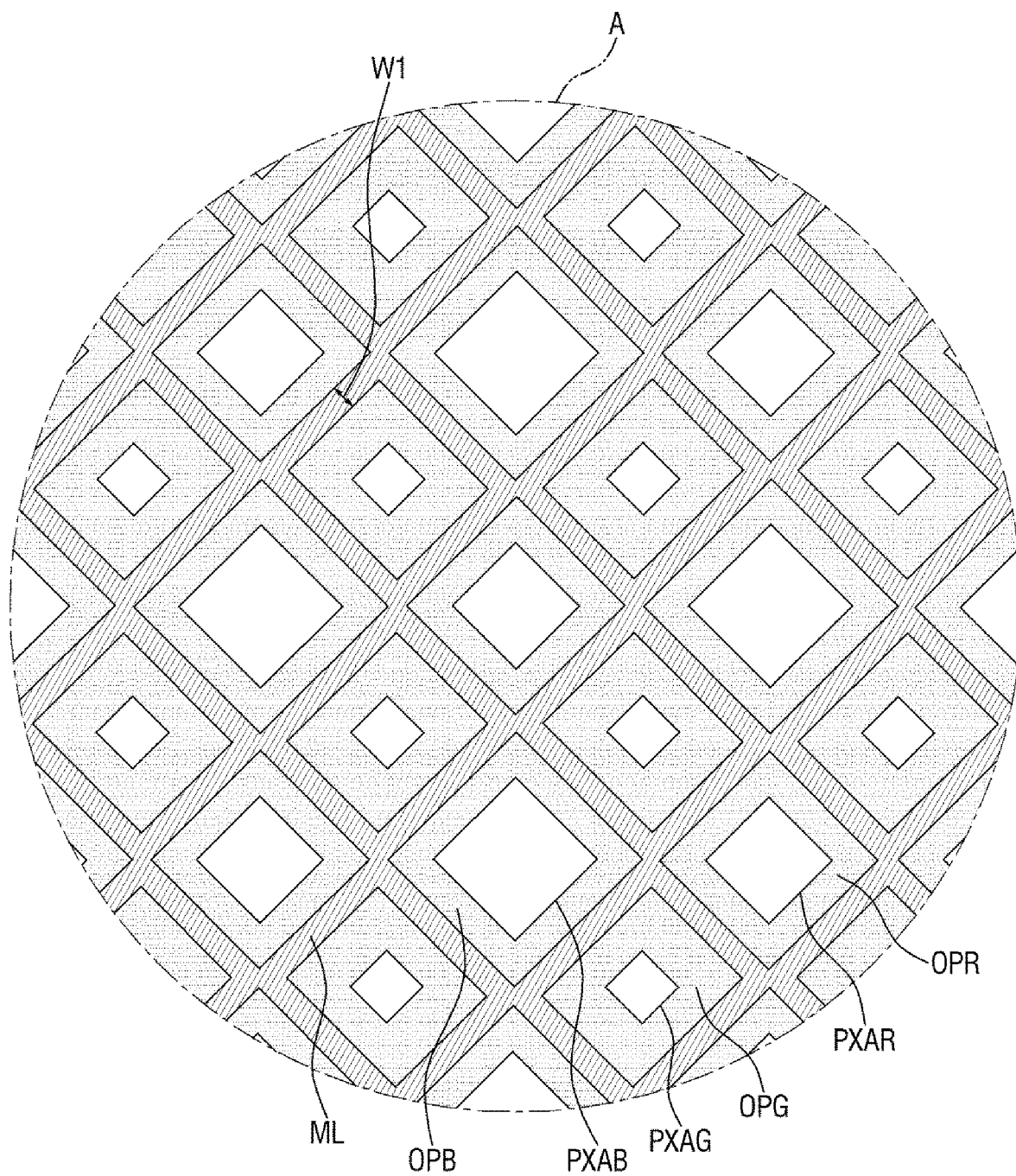
FIG. 3 is an enlarged top plan view of an area A of FIG. 1.

In the exemplary embodiment of FIG. 1, taken with FIGS. 3 and 5 discussed above, the mesh lines ML each extending in a single direction collectively extend in two different directions within a single sensing pattern. While lengths of the mesh lines ML in FIG. 1 extend in a single first inclined direction and single second inclined direction to intersect one another to form a mesh shape, the extension directions are not limited thereto. In an exemplary embodiment, the collection of single length direction mesh lines ML may be extended parallel to the first and second directions dr1 and dr2, and may intersect one another to form a mesh shape.

The line width of the mesh lines ML may differ from one location to another location in the display area DA. Specifically, the line width of mesh lines ML that form the first sensing patterns SP1 may be greater at a location near (outer) sides of the display area DA than at a location away from the sides of the display area DA. Conversely, the line width of mesh lines ML that form the first sensing patterns SP1 may be smaller at a location near the center of the display area DA than at a location further away from the center of the display area DA (e.g., towards the outer side).

As used herein, the term "the line width of mesh lines" may be defined as the width or dimension of the mesh lines ML, measured in a direction perpendicular to the direction in which the mesh lines ML lengthwise extend. Due to the above-described structure of the first sensing patterns SP1, the difference in touch sensitivity between an outer side and an inner side of the display area DA can be minimized.

The second sensing patterns SP2 may also have a mesh shape, and the line width of mesh lines ML that form the second sensing patterns SP2 may also differ from one location to another location in the display area DA. This will be described later in detail.

FIG. 2 is a cross-sectional view taken along lines I-I' and II-II' of FIG. 1. While FIG. 2 is shown as a view of the first direction dr1, the relative structures in FIG. 2 may also be applied to a view of the second direction dr2.

Referring to FIGS. 1 and 2, the display device includes a display unit 100, an encapsulation multilayer film 200, and the touch unit 300. The display device and the components thereof may be disposed in a plane defined by the first and second directions dr1 and dr2. A thickness of the display device and the components thereof is defined in a third direction which crosses each of the first and second directions dr1 and dr2, such a being perpendicular thereto.

The display unit 100 includes a (base) substrate 110, a circuit element layer 120, and a display element layer 130.

The substrate 110 supports the entire display device and elements thereof and maintains the overall rigidity of the display device and the elements thereof. The substrate 110 may have a flat top surface and may include or be formed of a transparent insulating material. In an exemplary embodiment, for example, the substrate 110 may include or be formed of glass, but the present disclosure is not limited thereto. That is, the substrate 110 may also include or be formed of a plastic material such as polyethersulphone ("PES"), polyacrylate ("PAR"), or the like. The substrate 110 may also include or be formed of an opaque material such as a metal or carbon fiber. In order to realize a flexible display device, the substrate 110 may also include or be formed of a flexible plastic material such as a polyimide (PI) film.

The substrate 110 is divided into the display area DA and the peripheral area NDA which is at the periphery of the display area DA. The display area DA may be disposed at a relative center of the substrate 110 to be disposed a distance from edges of the substrate 110, and may be an area in which an image is displayed with light. Pixels may be defined in the display area DA, and the image and the light may be generated and displayed at the pixels. The peripheral area NDA may be disposed along the sides or edges of the substrate 110 to surround the display area DA and may be an area in which no image is displayed.

The circuit element layer 120 includes at least one insulating layer and circuit elements. The circuit elements include (conductive) signal lines and the driving circuits which drive elements with the pixels. In an exemplary embodiment of manufacturing a display device, the circuit element layer 120 may include or be formed by forming an insulating layer, a semiconductor layer, and a conductive layer through coating, deposition, or the like and patterning the insulating layer, the semiconductor layer, and the conductive layer through photolithography.

The display element layer 130 includes a light-emitting element. The display element layer 130 may include an organic light-emitting diode ("OLED") which generates and emits light at the pixels. The display element layer 130 may further include an organic film such as a pixel-defining film which defines areas of the pixels, such as defining a light-emitting area at which light is generated and/or emitted.

The encapsulation multilayer film 200 encapsulates the display element layer 130. The encapsulation multilayer film 200 includes at least one insulating layer. Referring to the layered structure at the edge portion of the display device disposed at line I-I' of FIGS. 1 and 2, the encapsulation multilayer film 200 contacts the substrate 110 such that the display element layer 130 is not exposed outside the display device. The encapsulation multilayer film 200 may include at least one inorganic film (hereinafter, referred to as the encapsulation inorganic) and at least one organic film (hereinafter, referred to as the encapsulation organic film). The encapsulation multilayer film 200 and the encapsulation organic film may be alternately stacked within the encapsulation multilayer film 200. Referring to FIG. 2, the encapsulation multilayer film 200 may include a first inorganic layer 210, a first organic layer 220 disposed on the first inorganic layer 210, a second inorganic layer 230 disposed on the first organic layer 220, a second organic layer 240 disposed on the second inorganic layer 230, and a third inorganic layer 250 disposed on the second organic layer 240.

The encapsulation multilayer film 200 protects the display element layer 130 from moisture and/or oxygen which may be incident from outside the display device. The encapsulation organic film protects the display element layer 130 from a foreign material such as dust particles which may be incident from outside the display device. The encapsulation multilayer film 200 may include a silicon nitride layer, a silicon oxynitride layer, a silicon oxide layer, a titanium oxide layer, or an aluminum oxide layer, but the present disclosure is not limited thereto. The encapsulation organic film may include an acrylic organic film, but the present disclosure is not limited thereto.

A portion of the encapsulation multilayer film 200 overlapping with or in the display area DA may have a different thickness from a portion of the encapsulation multilayer film 200 overlapping with or in the peripheral area NDA. Also, the thickness of the encapsulation multilayer film 200 may vary from one location to another location even within the display area DA. The encapsulation multilayer film 200 may have the different thicknesses along the substrate 110 because during curing of organic material layers of the encapsulation multilayer film 200, which are initially disposed in the display area DA, may flow along the substrate 110 such as to be disposed out of the display area DA. That is, the thicknesses of the first, second and third inorganic layers 210, 230 and 250 may be uniform even after curing of material layers of the encapsulation multilayer film 200, but the first and second organic layers 220 and 240 may be thinner closer to the sides or edges of the display area DA than away from the sides of the display area DA.

The thickness of the encapsulation multilayer film 200 may be the same as the sum of the thicknesses of all the layers that form the encapsulation multilayer film 200. A first height h1 may be defined as a total thickness of the encapsulation multilayer film 200 in a central area CA of the display area DA, a second height h2 may be defined as a total thickness of the encapsulation multilayer film 200 in an adjacent area AA which is in the display area DA but adjacent (closest) to the peripheral area NDA, and a third height h3 may be defined as a total thickness of the encapsulation multilayer film 200 in the peripheral area NDA. The first height h1 may be greater than the second height h2, and the second height h2 may be greater than the third height h3. The total thicknesses are inclusive of each layer 210-250 of the encapsulation multilayer film 200.

As indicated by a dotted line in FIG. 1, the central area CA may be a total planar area in A rhombic shape including sensing patterns disposed or formed at the center of the display area DA. In FIG. 1, the central area CA includes a portion of the third first sensing electrode SE13, which is disposed at the center, among portions of the first sensing electrodes SE11 through SE15, and a portion of the fourth second sensing electrode SE24, which is disposed at the center, among portions of the second sensing electrodes SE21 through SE27. With reference to the central area CA, the adjacent area AA may be a total planar including sensing patterns disposed or formed directly adjacent to the central area CA. In FIG. 1, the adjacent area includes a portion of the first and fifth first sensing electrodes SE11 and SE15, which are disposed on the left and right sides, respectively, of the display area DA, and the first and seventh second sensing electrodes SE21 and SE27, which are disposed at the upper and lower sides, respectively, of the display area DA.

Referring again to FIG. 1, the touch unit 300 is disposed on the encapsulation multilayer film 200. The touch unit 300 includes the first sensing electrodes SE11 through SE15, the second sensing electrodes SE21 through SE27, the first signal lines SL11 through SL15, the second signal lines SL21 through SL27, the pads PD, and a protective insulating layer 310.

The planar shapes and the functions of the first sensing electrodes SE11 through SE15, the second sensing electrodes SE21 through SE27, the first signal lines SL11 through SL15, the second signal lines SL21 through SL27, and the pads PD are as described above with reference to FIG. 1. Since the total thickness of the encapsulation multilayer film 200 varies from one location to another location among locations of the display device, the first sensing electrodes SE11 through SE15 or the second sensing electrodes SE21 through SE27 may be disposed or formed at different levels within the display device taken in a cross-section. As used herein, the term "level in a cross section" may denote the distance or height by which bottom surfaces of the first sensing electrodes SE11 through SE15 or the second sensing electrodes S21 through SE27 are spaced apart from the top surface of the substrate 110. While FIG. 2 shows first sensing electrodes SE11 and SE13, the following discussion may be applied to second sensing electrodes disposed at similar locations along the substrate 110.

Specifically, the third first sensing electrode SE13, which is disposed in the central area CA, may be spaced apart from the substrate 110 by a fourth height h4, in a cross-section, and the first first sensing electrode SE11, which is disposed in the adjacent area AA, may be spaced apart from the substrate 100 by a fifth height h5 in cross-section. The fourth height h4 may be greater than the fifth height h5. Accordingly, the third first sensing electrode SE13, which is disposed in the central area CA, and the first first sensing electrode SE11, which is disposed in the adjacent area AA, may have a level difference corresponding to a sixth height h6. The sixth height h6 may correspond to the difference between the fourth and fifth heights h4 and h5 or between the first and second heights h1 and h2.

Due to the height differences between the first sensing electrodes SE11 through SE15 and between the second sensing electrodes SE21 through SE27, a touch sensitivity difference may be generated between the central area CA and the adjacent area AA. Specifically, various elements included in the circuit element layer 120 and the OLEDs included in the display element layer 130 may be disposed at various levels and may thus influence the touch unit 300. The influence of the elements included in the circuit element layer 120 and the OLEDs included in the display element layer 130 on the touch unit 300 may be noise, and the more the noise, the duller the touch sensitivity. Since the distance between the touch unit 300 and the display unit 100 is relatively small in the adjacent area AA, touch sensitivity may become even duller in the adjacent area AA because of the influence of the noise.

Accordingly, even if the user applies touch input to the touch unit 300 under the same conditions, the measured capacitance from the central area CA and the measured capacitance from the adjacent area AA may differ from each other. In order to compensate for such difference, the line width of the mesh lines ML of the first sensing electrodes SE11 through SE15 may differ from the line width of the mesh lines ML of the second sensing electrodes SE21 through SE27, and this will hereinafter be described with reference to FIGS. 3 and 4.

Figure 4:
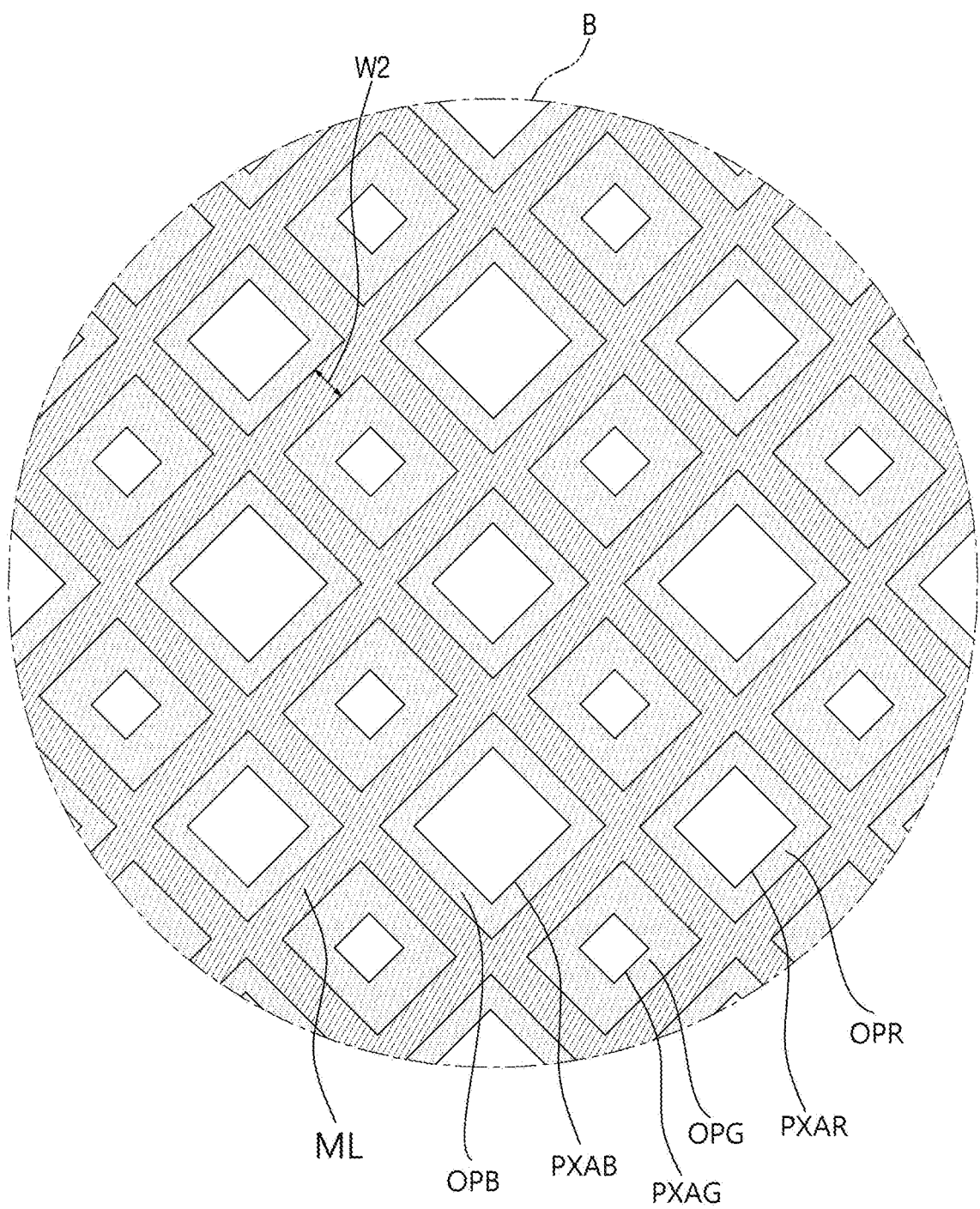
FIG. 4 is an enlarged top plan view of an area B of FIG. 1.

FIG. 3 is an enlarged top plan view of an area A of FIG. 1, FIG. 4 is an enlarged top plan view of an area B of FIG. 1, and FIG. 5 is an enlarged top plan view of an area C of FIG. 1.

Referring to FIGS. 3 through 5, the mesh lines ML of the first, second or third first sensing electrode SE11, SE12, or SE13 of FIG. 1 may define a plurality of mesh holes (OPR, OPG, and OPB). The mesh lines ML may have a triple-layer structure of Ti/Al/Ti. The plurality of mesh holes (OPR, OPB, and OPG) may correspond to a plurality of light-emitting (opening) regions (PXAR, PXAG, and PXAB), respectively. The plurality of light-emitting regions (PXAR, PXAG, and PXAB) may be the regions where OLEDs (not illustrated) actually emit generated light.

The plurality of light-emitting regions (PXAR, PXAG, and PXAB) may be divided into a plurality of groups according to the color of light emitted by each of the OLEDs. FIGS. 3 through 5 illustrate an example in which the plurality of light-emitting regions (PXAR, PXAG, and PXAB) are divided into three groups according to the color of light emitted by each of the OLEDs. In an exemplary embodiment, a pixel-defining film (shaded portions within mesh holes in FIGS. 3 through 5) which defines areas of the pixels may be exposed at the plurality of mesh holes (OPR, OPB, and OPG). Such pixel-defining film may define the plurality of light-emitting regions (PXAR, PXAG, and PXAB) at which light is generated and/or emitted.

A total planar area of the plurality of light-emitting regions (PXAR, PXAG, and PXAB) may vary depending on the color of light emitted by each of the OLEDs.

The plurality of mesh holes (OPR, OPG, and OPB) may be divided into a plurality of groups having different planar areas. FIGS. 3 through 5 illustrate an example in which the plurality of mesh holes (OPR, OPG, and OPB) are divided into three groups according to respective light-emitting regions.

The plurality of mesh holes (OPR, OPG, and OPB) are illustrated as, but are not limited to, corresponding to the plurality of light-emitting regions (PXAR, PXAG, and PXAB), respectively. The plurality of light-emitting regions (PXAR, PXAG, and PXAB) are illustrated as, but are not limited to, having various planar areas, and the plurality of mesh holes (OPR, OPG, and OPB) are also illustrated as, but are not limited to, having various planar areas. The planar shapes of the plurality of mesh holes (OPR, OPG, and OPB) are not particularly limited, and the plurality of mesh holes (OPR, OPG, and OPB) may have a rhombic shape or a polygonal shape other than a rhombic shape in the top plan view. The plurality of mesh holes (OPR, OPG, and OPB) may also have a polygonal shape with rounded corners.

A first width W1 may be defined as the line width of the mesh lines ML of the third first sensing electrode SE13 of FIG. 1, which is disposed in the area A, a second width W2 may be defined as the line width of the mesh lines ML of the second first sensing electrode SE12 of FIG. 1, which is disposed in the area B, and a third width W3 may be defined as the line width of the mesh lines ML of the first first sensing electrode SE11 of FIG. 1, which is disposed in the area C. As described above, the line width of the mesh lines ML may be defined as the width of the mesh lines ML, measured in the direction perpendicular to the direction in which the mesh lines ML lengthwise extend. The third width W3 may be greater than the second width W2, and the second width W2 may be greater than the first width W1. That is, the line widths effectively define a sensing input area of a sensing pattern, such that a sensing pattern having the third width W3 provides a larger sensing input area than a sensing pattern having the second or first widths W2 or W1.

Specifically, as the line width of the mesh lines ML increases, the touch sensitivity of the mesh lines ML may be gradually enhanced. Thus, even if the second first sensing electrode SE12, which is disposed in the area B, is located at a level closer to the substrate 110 than that of the third first sensing electrode SE13, which is disposed in the area A, touch sensitivity can be uniformly maintained in both the areas A and B by making the line width of the mesh lines ML of the second first sensing electrode SE12 greater than the line width of the mesh lines ML of the third first sensing electrode SE13.

Similarly, even if the first first sensing electrode SE11, which is disposed in the area C, is located at a level closer to the substrate 110 than that of the second first sensing electrode SE12, which is disposed in the area B, touch sensitivity can be uniformly maintained in both the areas B and C by making the line width of the mesh lines ML of the first first sensing electrode SE11 greater than the line width of the mesh lines ML of the second first sensing electrode SE12.

That is, the mesh lines ML of the third first sensing electrode SE13 may have the smallest line width, the mesh lines ML of each of the first and fifth first sensing electrodes SE11 and SE15 may have the largest line width, and the mesh lines ML of each of the second and fourth first sensing electrodes SE12 and SE14 may have a second greatest line width.

This tendency in the line width of the mesh lines ML of each of the first sensing electrodes SE11 through SE15 may also be directly applicable to the mesh lines ML of each of the second sensing electrodes SE21 through SE27 of FIG. 1, relative to areas when are disposed at different distances from the central area CA.

The area of the plurality of mesh holes (OPR, OPG, and OPB) may vary depending on the line width of the mesh lines ML of each of the first sensing electrodes SE11 through SE15.

Specifically, mesh holes OPR, OPG, or OPB in the area A may have a largest planar area, mesh holes OPR, OPG, or OPB in the area C may have a smallest planar area, and mesh holes OPR, OPG, or OPB in the area C may have a second largest planar area. That is, the planar area of the plurality of mesh holes (OPR, OPG, and OPB), which are formed by the first sensing electrodes SE11 through SE15 of FIG. 1, may decrease as a sensing pattern and/or the sensing electrode is disposed further away from the third first sensing electrode SE13 (e.g., a central area CA of the display area DA).

Figure 6:
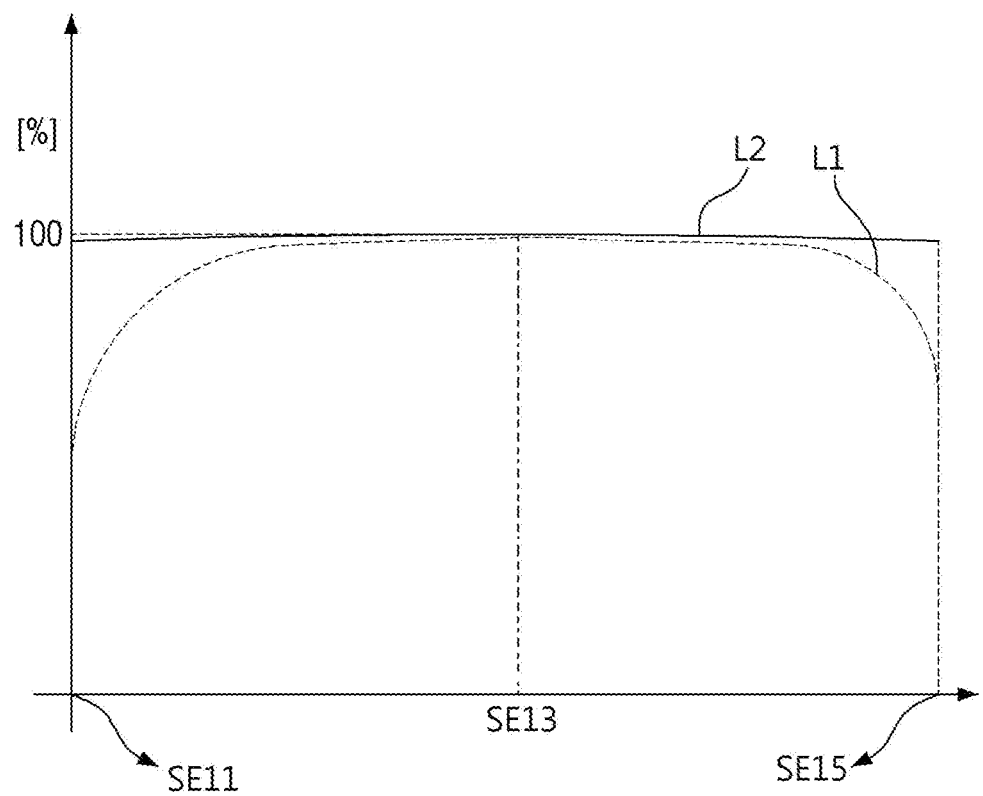
FIG. 6 is a graph showing the touch sensitivity, from position to position, of the display device according to the exemplary embodiment of FIG. 1.

FIG. 6 is a graph showing the touch sensitivity, from position to position, of the display device according to the exemplary embodiment of FIG. 1.

Specifically, FIG. 6 shows variations in capacitance in units of percent (%), measured along an arbitrary line extended in the first direction dr1 to pass through the central area CA when applying touch input having a uniform intensity to the entire display area DA. That is, referring to FIG. 6, the origin represents the position of the first first sensing electrode SE11, a furthest point on the X axis from the origin represents the position of the fifth first sensing electrode SE15, and a point in the middle on the X axis represents the position of the third first sensing electrode SE13. The Y axis represents a capacitance variation measured from each of the first sensing electrodes SE11 through SE15, relative to a baseline capacitance variation, i.e., the capacitance variation measured from the third first sensing electrode SE13.

A first line L1 shows capacitance variations when the mesh lines ML of each of the first sensing electrodes SE11 through SE15 all have the same line width. In this case, only a capacitance variation of less than 100% can be detected from the first sensing electrodes on both sides of the display area DA, i.e., the first and fifth first sensing electrodes SE11 and SE15, and differences in touch sensitivity may be generated between areas.

A second line L2 shows capacitance variations measured from the first sensing electrodes SE11 through SE15 according to the exemplary embodiment of FIGS. 1 through 5, as including the first sensing electrodes SE11 through SE15 having varying line widths. In this case, capacitance variation measurements obtained from the first sensing electrodes SE11 through SE15 are generally uniform. Specifically, the capacitance measured from the first first sensing electrode SE11 in response to a given touch input may be in the range of about ±2% of the capacitance measured from the third first sensing electrode SE13 in response to the same given touch input.

That is, according to the exemplary embodiment of FIGS. 1 through 5 as including the first sensing electrodes SE11 through SE15 having varying line widths, in response to the same input being applied to the entire display area DA, similar capacitance variations may be measured from positions located at any of the first sensing electrodes SE11 through SE15.

Figure 7:
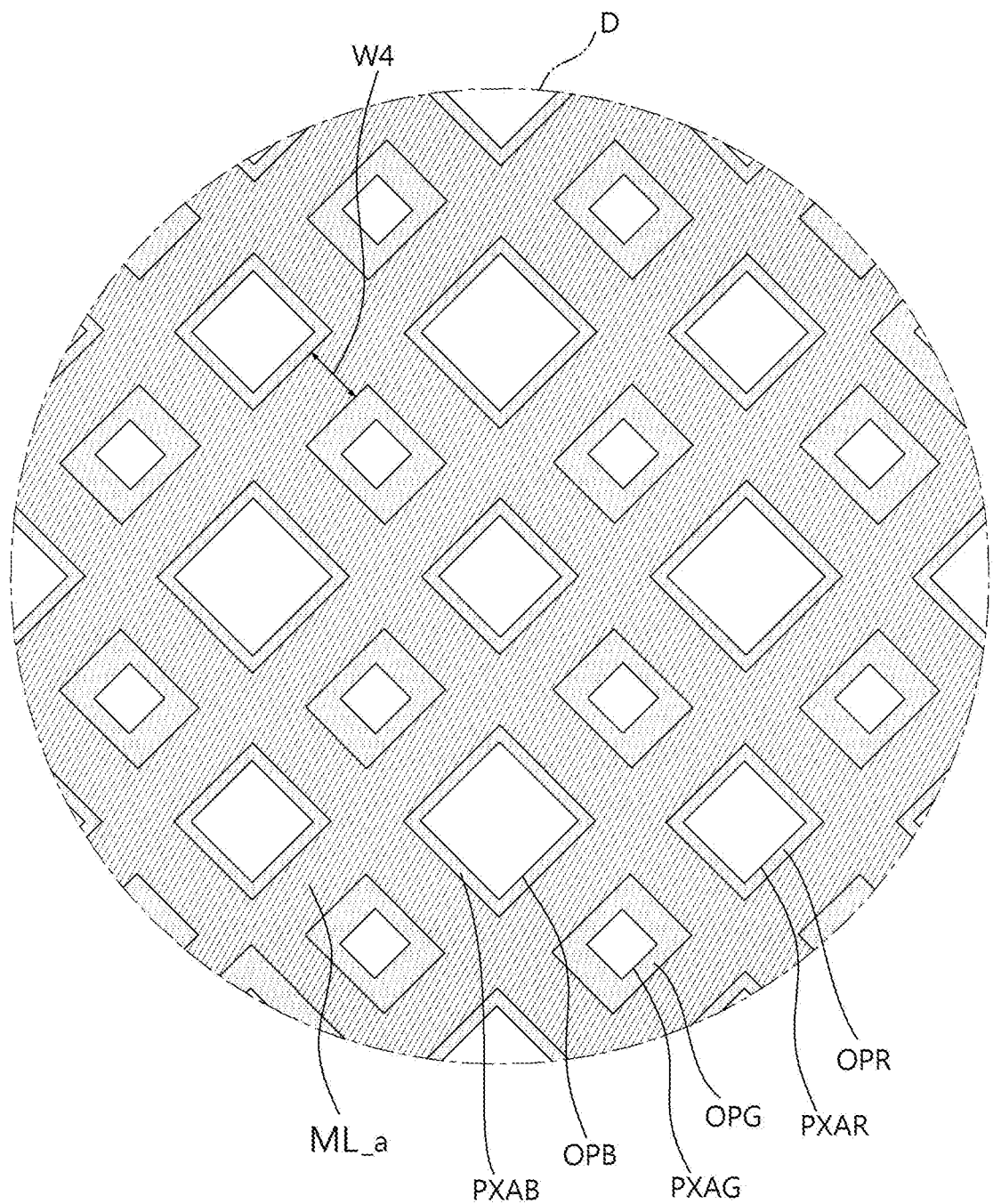
FIG. 7 is an enlarged top plan view of an area D of FIG. 1 in another exemplary embodiment of a display device according to the invention.

FIG. 7 is an enlarged to plan view of an area D of FIG. 1 of another exemplary embodiment of a display device according to the invention.

As described above, the first sensing electrodes SE11 through SE15 respectively extend in a second direction dr2 and the second sensing electrodes SE21 through SE27 respectively extend in the first direction dr1. In the display device according to the exemplary embodiment of FIGS. 1 through 5, the line width of the mesh lines ML forming the sensing patterns thereof varies from one first sensing electrode to another first sensing electrode, but is uniform within the same first sensing electrode along a length direction (dr2) thereof. In an exemplary embodiment, for example, the mesh lines ML of the first first sensing electrode SE11 of FIG. 1 may have the same line width (e.g., the width W3 of FIG. 5), and the mesh lines ML of the third first sensing electrode SE13 of FIG. 1 may have the same line width (e.g., the width W1 of FIG. 3). The same may be applied to the second sensing SE21 through SE27 along the lengths (dr1) thereof.

In the display device according to the exemplary embodiment of FIG. 7, unlike in the display device according to the exemplary embodiment of FIGS. 1 through 5, the line width of mesh lines forming sensing patterns may vary from one location to another, even within the same first or second sensing electrode along a length thereof. The exemplary embodiment of FIG. 7 will hereinafter be described, focusing mainly on the difference with the exemplary embodiment of FIG. 1, e.g., the structure of a first first sensing electrode SE11, and descriptions of other elements of the display device according to the exemplary embodiment of FIG. 7 will be omitted or at least simplified. In FIGS. 1 through 7, like reference numerals indicate like elements.

Referring to FIGS. 1 and 7, the area D is further apart than the area C from the central area CA of the display area DA. Thus, a thickness of a portion of an encapsulation multilayer film 200 overlapping with the area D may be smaller than a thickness of a portion of the encapsulation multilayer film 200 overlapping with the area C. Referring to the relative thicknesses in FIG. 2, the I-I' section may represent the encapsulation multilayer film 200 overlapping with the area D, while the II-II' section may represent the encapsulation multilayer film 200 overlapping with the area C. Accordingly, even if the same first first sensing electrode SE11 is disposed in both the areas C and D, the line width of mesh lines ML_a in the area D may be different from the line width of the mesh lines ML (of FIG. 5) in the area C.

Specifically, the mesh lines ML_a in the area D may have a fourth width W4. As illustrated in FIG. 5, the mesh lines ML in the area C may have the third width W3. Taking FIGS. 1, 5 and 7 together, the fourth width W4 may be greater than the third width W3. That is, since the line widths effectively define a sensing input area of a sensing pattern as described above, a sensing pattern having the fourth width W4 provides a larger sensing input area than a sensing pattern having the first to third widths W1 to W3.

The mesh lines ML_a or ML within a same first sensing electrodes, may be disposed or formed to have the third width W3 and/or the fourth width W4 in units of first sensing patterns SP1. That is, within a same first sensing pattern SP1, widths of the mesh lines may be the same. In contrast, as between different first sensing patterns SP1, widths of the mesh lines may be different from each other and may relatively increase as positions of the sensing patterns SP1 become further from a central area along a direction parallel to the second direction dr2.

The structure of the mesh lines ML_a may also be directly applicable to other first sensing electrodes, e.g., second, third, fourth, and fifth first sensing electrodes SE12, SE13, SE14, and SE15 along respective lengths thereof, and second sensing electrodes SE21 through SE27 along respective lengths thereof. As a result, the sensitivity of the touch unit 300 may become uniform throughout the entire display area DA.

Figure 8:
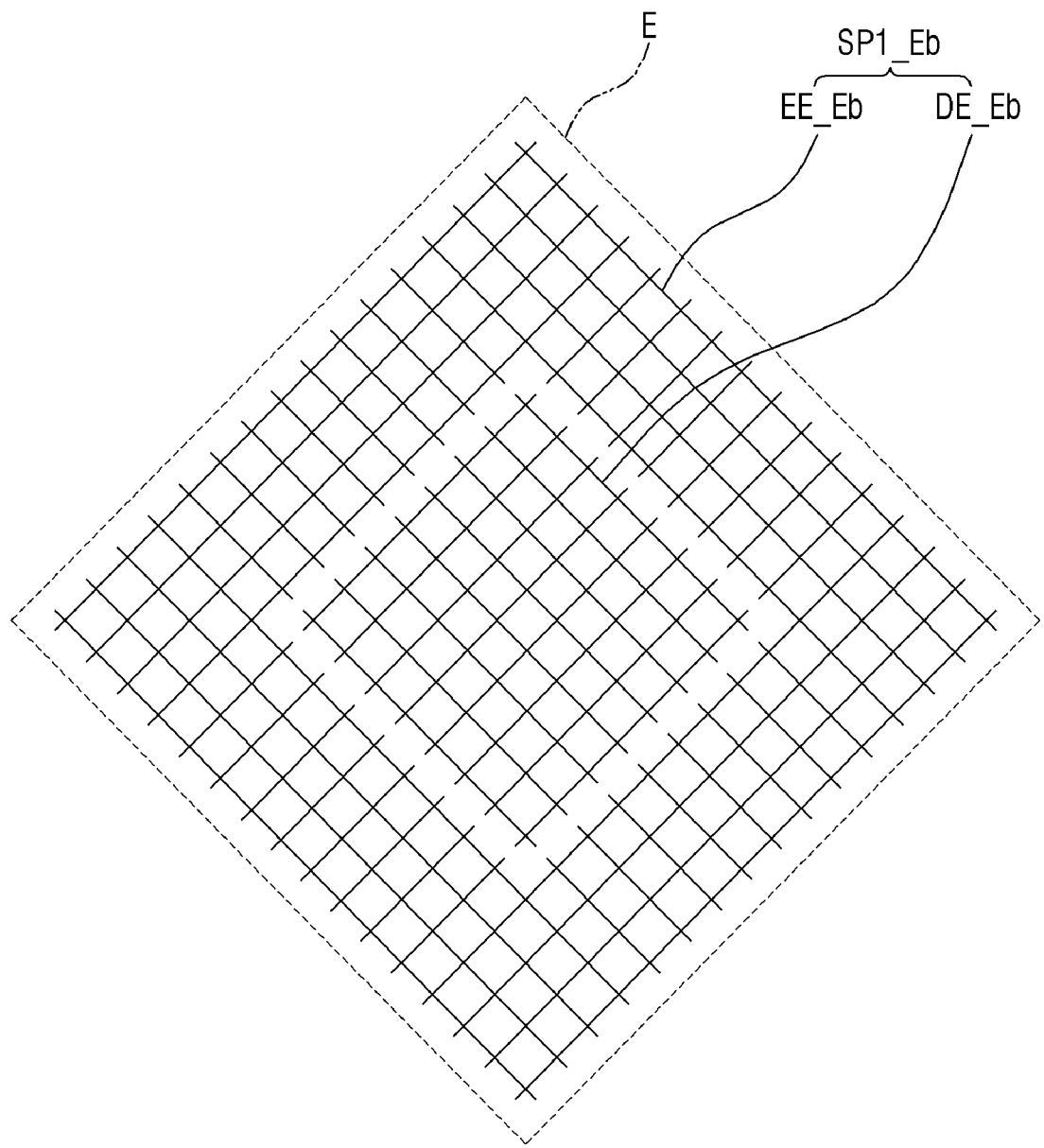
FIG. 8 is an enlarged top plan view of an area E of FIG. 1 in still another exemplary embodiment of a display device according to the invention.
Figure 9:
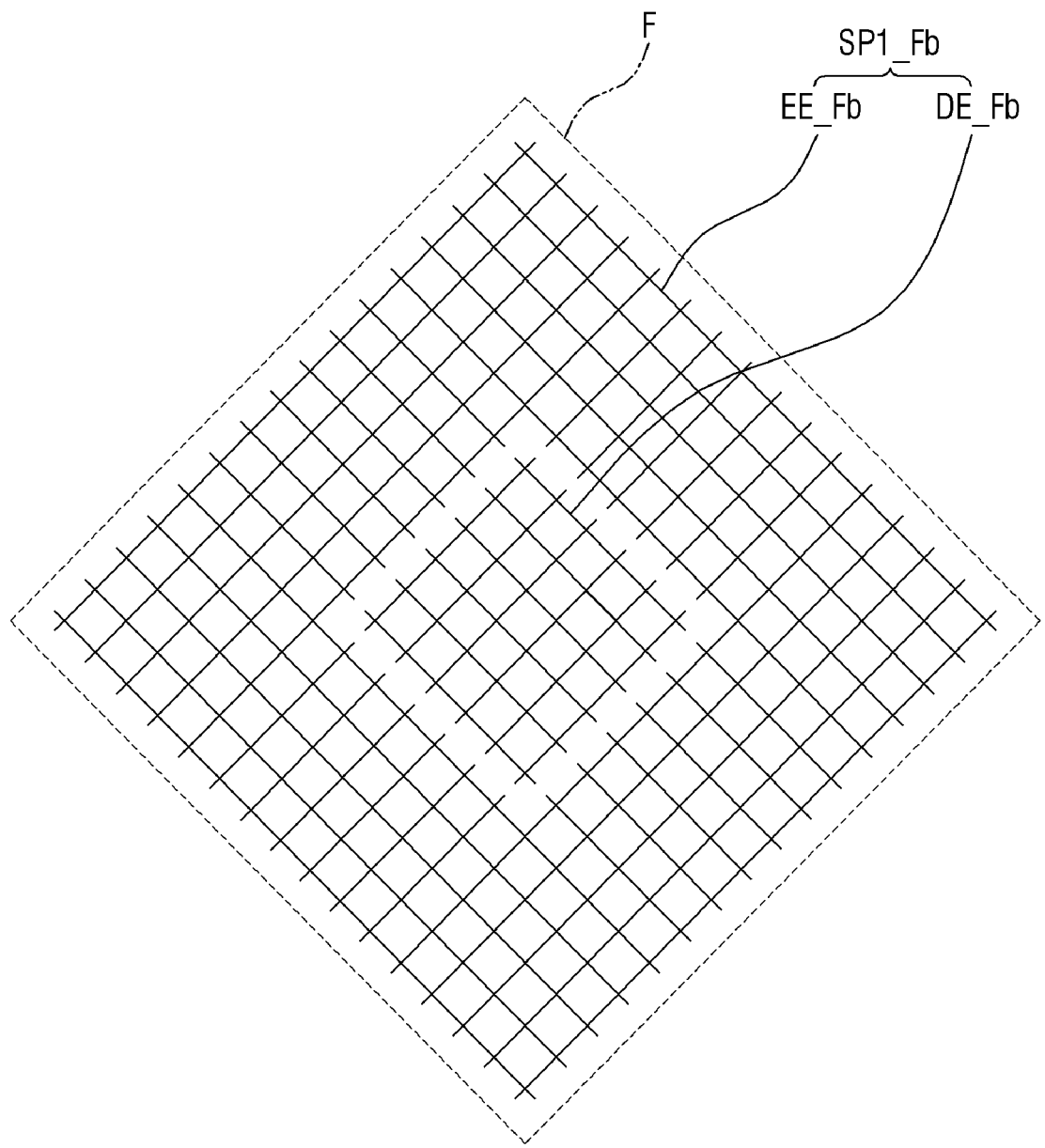
FIG. 9 is an enlarged top plan view of an area F of FIG. 1 in the display device of FIG. 8.
Figure 10:
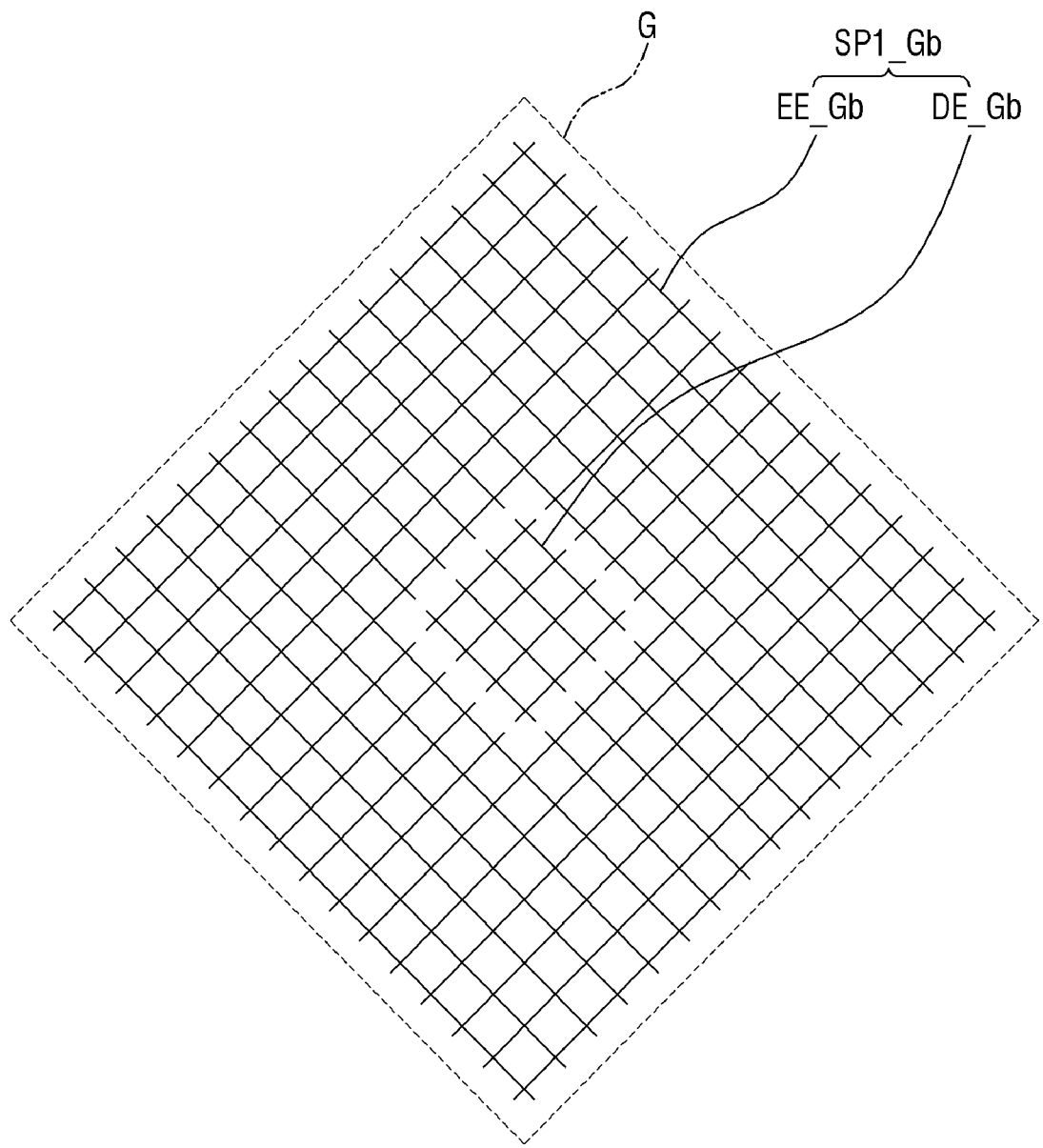
FIG. 10 is an enlarged top plan view of an area G of FIG. 1 in the display device of FIG. 8.

FIG. 8 is an enlarged top plan view of an area E of FIG. 1 in still another exemplary embodiment of a display device according to the invention, FIG. 9 is an enlarged top plan view of an area F of FIG. 1 in the display device of FIG. 8; and FIG. 10 is an enlarged top plan view of an area G of FIG. 1 in the display device of FIG. 8.

The area E may correspond to an area in which a single first sensing pattern SP1 of the third first sensing electrode SE13 of FIG. 1 is disposed, the area F may correspond to an area in which a single first sensing pattern SP1 of the first first sensing electrode SE11 of FIG. 1 is disposed, and the area G may correspond to an area in which a single first sensing pattern SP1 of the first first sensing electrode SE11 of FIG. 1, but may be a different area from the area F.

The display device according to the exemplary embodiment of FIG. 8 differs from the display device according to the previous exemplary embodiments in that first sensing patterns SP1_Eb, SP1_Fb, and SP1_Gb are divided into effective sensing electrodes EE_Eb, EE_Fb, and EE_Gb, respectively, and dummy electrodes DE_Eb, DE_Fb, and DE_Gb, respectively. The exemplary embodiment of a display device taking FIGS. 8 through 10 together with FIG. 1 will hereinafter be described, focusing mainly on the difference with the exemplary embodiment of FIGS. 2 through 5 together with FIG. 1, e.g., the structure of the first sensing patterns SP1_Eb, SP1_Fb, and SP1_Gb, and descriptions of other elements of the display device according to the exemplary embodiment of FIGS. 8 through 10 will be omitted or at least simplified. In FIGS. 1 through 10, like reference numerals indicate like elements. For convenience, connecting electrodes CE of FIG. 1 are not illustrated in FIGS. 8 through 10.

Referring to FIGS. 8 through 10, the first sensing patterns SP1_Eb, SP1_Fb, and SP1_Gb include the effective sensing electrodes EE_Eb, EE_Fb, and EE_Gb, respectively, and the dummy electrodes DE_Eb, DE_Fb, and DE_Gb, respectively. The first sensing patterns SP1_Eb, SP1_Fb, and SP1_Gb may have the same total planar area as each other. The total planar area may be defined by outer edges of the effective sensing electrodes EE_Eb, EE_Fb, and EE_Gb, but the present disclosure is not limited thereto.

The effective sensing electrodes EE_Eb, EE_Fb, and EE_Gb may be electrodes that actually receive signals from, and transmit detected voltage variations to, the outside of the display area DA and/or the display device. In an exemplary embodiment, for example, the effective sensing electrode EE_Eb in the area E may be included in the third first sensing electrode SE13 of FIG. 1 and may be electrically connected to the third first signal line SL13 of FIG. 1, the effective sensing electrode EE_Fb in the area F may be included in the first first sensing electrode SE11 of FIG. 1 and may be electrically connected to the first first signal line SL11 of FIG. 1, and the effective sensing electrode EE_Gb in the area G may be included in the first first sensing electrode SE11 of FIG. 1 and may be electrically connected to the first first signal line SL11 of FIG. 1. That is, the effective sensing electrodes EE_Eb, EE_Fb, and EE_Gb may be electrodes that actually perform a sensing operation. The effective sensing electrodes EE_Eb, EE_Fb, and EE_Gb may be formed in a mesh shape by mesh lines and may surround the dummy electrodes DE_Eb, DE_Fb, and DE_Gb, respectively. The mesh lines of the effective sensing electrodes EE_Eb, EE_Fb, and EE_Gb may be disconnected from the dummy electrodes DE_Eb, DE_Fb, and DE_Gb as shown by the space therebetween in FIGS. 8 through 10, respectively, but the present disclosure is not limited thereto.

The dummy electrodes DE_Eb, DE_Fb, and DE_Gb may be electrodes that are not connected to another element of the display device and/or the outside of the display area DA or display device, and remain electrically floated. The dummy electrodes DE_Eb, DE_Fb, and DE_Gb may be surrounded by the effective sensing electrodes EE_Eb, EE_Fb, and EE_Gb, respectively.

Since the first sensing patterns SP1_Eb, SP1_Fb, and SP1_Gb include the effective sensing electrodes EE_Eb, EE_Fb, and EE_Gb, respectively, and the dummy electrodes DE_Eb, DE_Fb, and DE_Gb, respectively, the first sensing patterns SP1_Eb, SP1_Fb, and SP1_Gb may have an appropriate electrical resistance for sensing touch input and may also have an appropriate parasitic capacitance for the relationship with neighboring electrical and conductive elements.

As a ratio of the total planar area of the effective sensing electrode EE_Eb, EE_Fb, or EE_Gb to the total planar area of the first sensing pattern SP1_Eb, SP1_Fb, or SP1_Gb increases, the sensitivity for touch input may be improved. That is, the total planar area of the effective sensing electrode effectively define a sensing input area of a sensing pattern, such that among two sensing patterns, a sensing pattern having the larger total planar area effective sensing electrode provides a larger sensing input area than the other sensing pattern.

Thus, the total planar area of the effective sensing electrode EE_Eb in the area E may be smaller than the total planar area of the effective sensing electrode EE_Fb in the area F. Also, the total planar area of the dummy electrode DE_Eb in the area E may be greater than the total planar area of the dummy electrode DE_Fb in the area F. Accordingly, even if the first sensing pattern SP1_Fb in the area F is located on a lower level than the first sensing pattern SP1_Eb in the area E (refer to the relative structures in FIG. 2), the sensitivity for touch input can be uniformly maintained in both the areas E and F by making the total planar area of the effective sensing electrode EE_Fb in the area F greater than the total planar area of the effective sensing electrode EE_Eb in the area E.

Similarly, the total planar area of the effective sensing electrode EE_Fb in the area F may be smaller than the total planar area of the effective sensing electrode EE_Gb in the area G. Also, the total planar area of the dummy electrode DE_Fb in the area F may be greater than the total planar area of the dummy electrode DE_Gb in the area G. Accordingly, even if the first sensing pattern SP1_Gb in the area G is located on a lower level than the first sensing pattern SP1_Fb in the area F (refer to the relative structures in FIG. 2), the sensitivity for touch input can be uniformly maintained in both the areas F and G by making the total planar area of the effective sensing electrode EE_Gb in the area G greater than the total planar area of the effective sensing electrode EE_Fb in the area F.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device, comprising:
   a substrate divided into a display area at which an image is displayed with light and a peripheral area which is adjacent to the display area;
   a light-emitting element layer disposed on the substrate, the light-emitting element layer including a light-emitting element which generates and emits the light;
   a plurality of light-emitting regions which emit the light;
   a circuit element layer disposed on the substrate, the circuit element layer including a circuit element which drives the light-emitting element to generate and emit the light;
   an encapsulation film which encapsulates the light-emitting element layer on the substrate, portions of the encapsulation film being respectively disposed in the display area and in the peripheral area of the substrate; and
   a plurality of sensing electrodes each disposed on the portion of the encapsulation film which is in the display area, comprising a plurality of first sensing electrodes and a plurality of second sensing electrodes which intersect the first sensing electrodes,
   wherein
   each of the first sensing electrodes includes a plurality of mesh lines intersecting one another in a mesh shape, each mesh line having a width, the display area includes a first display portion located in a center of the display area and a second display portion adjacent to the peripheral area, and within the display area,
the widths of the mesh lines of the first sensing electrodes in the second display portion are greater than the widths of the mesh lines of the first sensing electrodes in the first display portion,
the plurality of light-emitting regions do not overlap the mesh lines, and
pitches of the light-emitting regions in the first display portion are the same as pitches of the light-emitting regions in the second display portion.

2. The display device of claim 1, wherein the portions of the encapsulation film which are disposed in the display area and in the peripheral area of the substrate each include a first inorganic layer, a first organic layer disposed on the first inorganic layer, and a second inorganic layer disposed on the first organic layer.

3. The display device of claim 2, wherein within the display area of the substrate, a thickness of the first organic layer of the encapsulation film decreases as a distance thereof from the center of the display area to the peripheral area decreases.

4. The display device of claim 3, wherein the first organic layer of the encapsulation film has a largest thickness at the center of the display area.

5. The display device of claim 2, wherein a thickness of the first organic layer disposed in the peripheral area is smaller than a thickness of the first organic layer disposed in the display area.

6. The display device of claim 1, wherein
the first sensing electrodes are arranged in a first direction and lengths thereof respectively extend in a second direction which intersects to the first direction, and
the second sensing electrodes are arranged in the second direction and lengths thereof respectively extend in the first direction.

7. The display device of claim 1, wherein
the each of the first sensing electrodes including the plurality of mesh lines intersecting one another in the mesh shape defines a planar area thereof, and
the planar areas of the mesh shapes decrease as a distance thereof from the center of the display area to the peripheral area decreases.

8. The display device of claim 1, wherein
within each of the first sensing electrodes, the mesh lines intersecting one another define a plurality of sensing patterns arranged along a length of the first sensing electrode, each sensing pattern defining a planar area thereof, and
the planar areas of the sensing patterns decrease as a distance thereof from the center of the display area to the peripheral area decreases.

9. The display device of claim 1, wherein
each of the second sensing electrodes includes a plurality of mesh lines intersecting one another in a mesh shape, each mesh line having a width, and
the widths of the mesh lines of the second sensing electrodes increase as a distance of the second sensing electrode from the center of the display area to the peripheral area decreases.

10. The display device of claim 1, wherein
within each of the first sensing electrodes the mesh lines intersecting one another define a plurality of mesh holes surrounding each of the light emitting regions, each mesh hole defining a planar area, and among mesh holes at which a same color light is emitted, the planar areas defined by the mesh holes decrease as the distance of the first sensing electrode from the center of the display area to the peripheral area decreases.

11. The display device of claim 1, wherein within the display area of the substrate, a thickness of the encapsulation film decreases as a distance thereof from the center of the display area to the peripheral area decreases, the encapsulation film disposing the plurality of sensing electrodes closer to the substrate as the distance of the encapsulation film from the center of the display area to the peripheral area decreases.

12. The display device of claim 1, wherein the first sensing electrodes are integrated on a top surface of the encapsulation film.

13. A display device, comprising:
a substrate divided into a display area at which an image is displayed with light and a peripheral area which is adjacent to the display area;
a light-emitting element layer disposed on the substrate, the light-emitting element layer including a light-emitting element which generates and emits the light;
a plurality of light-emitting regions which emit the light,
a circuit element layer disposed on the substrate, the circuit element layer including a circuit element which drives the light-emitting element to generate and emit the light;
an encapsulation film which encapsulates the light-emitting element layer on the substrate, portions of the encapsulation film being respectively disposed in the display area and in the peripheral area; and
a plurality of sensing electrodes each disposed on the portion of the encapsulation film which is in the display area, comprising a plurality of first sensing electrodes and a plurality of second sensing electrodes which intersects the first sensing electrodes, each of the first sensing electrodes including a plurality of mesh lines intersecting one another in a mesh shape, each mesh line having a width,
wherein within the display area,
each of the first sensing electrodes includes a plurality of sensing patterns which senses a touch input to the display device, each of the plurality of sensing patterns including:
an effective sensing electrode which senses the touch input and has a total planar area, and
a dummy electrode which is adjacent to the effective sensing electrode and has a total planar area,
the display area includes a first display portion located in a center of the display area and a second display portion adjacent to the peripheral area,
the total planar area of the effective sensing electrode in the second display portion is larger than the total planar area of the effective sensing electrode in the first display portion,
the plurality of light-emitting regions do not overlap the mesh lines, and
pitches of the light-emitting regions in the first display portion are the same as pitches of the light-emitting regions in the second display portion.

14. The display device of claim 13, wherein the portions of the encapsulation film which are disposed in the display area and in the peripheral area of the substrate each includes a first inorganic layer, a first organic layer disposed on the first inorganic layer, and a second inorganic layer disposed on the first organic layer.

15. The display device of claim 14, wherein within the display area of the substrate, a thickness of the first organic layer of the encapsulation film decreases as a distance thereof from the center of the display area to the peripheral area decreases.

16. The display device of claim 14, wherein a thickness of the first organic layer disposed in the peripheral area is smaller than a thickness of the first organic layer disposed in the display area.

17. The display device of claim 13, wherein the total planar areas of the dummy electrodes decrease as the distance of the first sensing electrode from the center area of the display area to the peripheral area decreases.

18. The display device of claim 13, wherein the plurality of sensing patterns have a same total planar area as each other.

19. The display device of claim 13, wherein the effective sensing electrode surrounds the dummy electrode in a top plan view.

20. The display device of claim 13, wherein the dummy electrode is electrically floated.

* * * * *